(12) United States Patent  
Tsukagoshi et al.

(10) Patent No.: US 8,983,370 B2  
(45) Date of Patent: Mar. 17, 2015

(54) COMMUNICATION TRANSMISSION APPARATUS, COMMUNICATION COUPLER AND IMPEDANCE ADJUSTING SHEET

(75) Inventors: Tsuneo Tsukagoshi, Tokyo (JP); Naoki Kobayashi, Tokyo (JP); Hiroshi Fukuda, Tokyo (JP); Koichiro Nakase, Tokyo (JP)

(73) Assignee: NEC Corporation, Tokyo (JP)

( * ) Notice: Subject to any disclaimer, the term of this patent is extended or adjusted under 35 U.S.C. 154(b) by 474 days.

(21) Appl. No.: 13/393,283

(22) PCT Filed: Sep. 1, 2010

(86) PCT No.: PCT/JP2010/064897  
§ 371 (c)(1),  
(2), (4) Date: Feb. 29, 2012

(87) PCT Pub. No.: WO2011/027770  
PCT Pub. Date: Mar. 10, 2011

(65) Prior Publication Data  
US 2012/0157024 A1  Jun. 21, 2012

(30) Foreign Application Priority Data

Sep. 1, 2009  (JP) ................................ 2009-202113

(51) Int. Cl.  
*H04B 7/24* (2006.01)  
*H04B 5/00* (2006.01)  
*H02J 17/00* (2006.01)

(52) U.S. Cl.  
CPC ............ *H04B 5/0031* (2013.01); *H04B 5/0037* (2013.01); *H02J 17/00* (2013.01)

USPC .............. 455/39; 343/897; 343/898; 343/899

(58) Field of Classification Search  
USPC .......................................................... 455/39  
See application file for complete search history.

(56) References Cited

U.S. PATENT DOCUMENTS

| | | | |
|---|---|---|---|
| 7,626,561 B2* | 12/2009 | Shinoda et al. | 343/897 |
| 7,724,203 B2* | 5/2010 | Shinoda et al. | 343/897 |
| 2012/0203514 A1* | 8/2012 | Cai et al. | 703/1 |

FOREIGN PATENT DOCUMENTS

| | | |
|---|---|---|
| CN | 101022696 A | 8/2007 |
| JP | 2001-203118 | 7/2001 |
| JP | 2005-093603 | 4/2005 |
| JP | 2005223634 A | 8/2005 |

(Continued)

OTHER PUBLICATIONS

International Search Report—PCT/JP2010/064897—Nov. 30, 2010.

(Continued)

*Primary Examiner* — Ajibola Akinyemi  
(74) *Attorney, Agent, or Firm* — Young & Thompson (57) ABSTRACT

A technique is proposed for reducing leakage electromagnetic field that reduces the electromagnetic leakage from a connection point between a communication coupler and a signal transmission apparatus and that can conduct both communication and transmission of electric power. The signal transmission apparatus includes: a first sheet conductive body portion constituting a lower portion electrode; and a second sheet conductive body portion in a mesh shape which is laminated on the first sheet conductive body portion while a gap area is sandwiched therebetween and which includes an uneven mesh size area on which a sheet impedance is continuously changed.

12 Claims, 12 Drawing Sheets

(56) References Cited

FOREIGN PATENT DOCUMENTS

| JP | 2006-229641 | 8/2006 |
|---|---|---|
| JP | 2006-270165 | 10/2006 |
| JP | 2007-53337 | 3/2007 |
| JP | 2007-082178 | 3/2007 |
| JP | 2007-150654 | 6/2007 |
| JP | 2007-281678 | 10/2007 |
| JP | 2009105599 A | 5/2009 |
| WO | 2007/032049 | 3/2007 |

OTHER PUBLICATIONS

NEC Corp. et al., Heisei 21 Nendo 'Aratana Tsushin Baitai o Riyo shita Surface Tsushin Gijutsu no Kenkyu Kaihatsu' no Kaihatsu Seika, Aratana Tsushin Baitai o Riyo shita Surface Tsushin Gijutsu no Kenkyu Kaihatsu Seika Image-zu, National Institute of Information and Communications Technology, 2010, http://www2.nict.go.jp/q/q265/s802/seika/h21/seika/137/137_gaiyou_g.pdf.

Naoshi Yamahira, et al., Proximity Connection in Two-Dimensional Signal Transmission, International Joint Conference SICE-ICASE, Oct. 18, 2006, pp. 2735-2740.

Hiroyuki Shinoda et al., Two-dimensional signal transmission technology for robotics, IEEE International Conference on Robotics and Automation, 2003. Proceedings., Sep. 14, 2003, vol. 3, pp. 3207-3212.

Yasutoshi Makino et al., Sensor Networking Using Two-Dimensional Electromagnetic Wave, Proceedings of the 22nd Sensor Symposium, Oct. 2005, pp. 83-88, http://www.alab.t.u-tokyo.ac.jp/~yasutoc/papers/05Sympo_Makino.pdf.

Chinese First Official Action dated Nov. 19, 2013; Application No. 201080038577.1.

Japanese Office Action dated Jul. 1, 2014 in corresponding Japanese Patent Application No. 2011-529910 with partial translation of Japanese Office Action.

Kei Nakatsuma et al., "Position Sensing based on Electric Field Measurement on Two-Dimensional Signal Transmission Sheet", 5th International Conference on Networked Sensing Systems, Jun. 17, 2008, INSS 2008, US, IEEE, pp. 189-194.

Azman Osman Lim et al. "Evaluation of Electromagnetic Field Measurement over Two-Dimensional Communication Media with Anti-Reflection Edged", The Institute of Electronics Information and Communication Engineers, IEICE Technical Report, MW2008-82, Aug. 21, 2008, pp. 19-24.

\* cited by examiner

COMMUNICATION TRANSMISSION APPARATUS, COMMUNICATION COUPLER AND IMPEDANCE ADJUSTING SHEET

TECHNICAL FIELD

The present invention relates to a communication system constituted from a sheet-shaped communication transmission apparatus and a communication coupler which is put on the communication transmission apparatus and which transmits a signal to a signal transmission apparatus, and in particular, relates to an electromagnetic field leakage reduction technique which reduces electromagnetic field when conducting a communication.

Priority is claimed on Japanese Patent Application No. 2009-202113, filed on Sep. 1, 2009, the content of which is incorporated herein by reference.

BACKGROUND ART

In recent years, in place of a conventional wireless system conducting a wireless communication by transmitting electromagnetic waves in a space, as shown in Patent Documents 1 and 2, a new communication system is developed and is in a practical use in which a communication is conducted by transmitting the electromagnetic field in a sheet-shaped communication medium.

Figure 13:
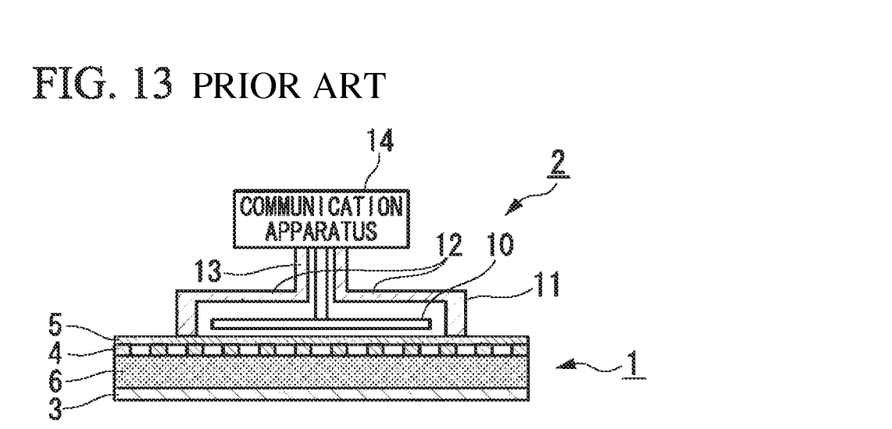
FIG. 13 is a front cross-section drawing showing a conventional communication system.

As shown in FIG. 13, such a communication system has a constitution including a sheet-shaped signal transmission apparatus 1 which is a communication medium and a communication coupler 2 which is an interface.

The signal transmission apparatus 1 which is formed to have a sheet-shaped structure includes a first sheet conductive portion 3 which constitutes a lower portion electrode, a second sheet conductive portion 4 in a meshed shape arranged at a position with a gap from the first sheet conductive portion 3, a first dielectric layer 5 arranged on the second sheet conductive portion 4 and a second dielectric layer 6 arranged between the first sheet conductive portion 3 and the second sheet conductive portion 4.

Further, as shown in FIG. 13, the communication coupler 2 includes: an internal conductive body 10 in a disk shape forming a communication element; an external conductive body 12 which is formed so as to cover the internal conductive body 10 and which constitutes a coupler body 11; and a coaxial cable 13 connected to the conductive bodies 10 and 11, wherein the coaxial cable 13 is connected to a communication apparatus 14. In accordance with such a constitution, an electromagnetic field including signals input/output from the communication apparatus 14 is conducted via the coaxial cable 13 and is brought in the signal transmission apparatus 1, and after this, a communication is conducted with a second communication coupler via transmission inside the signal transmission apparatus 1.

Figure 14:
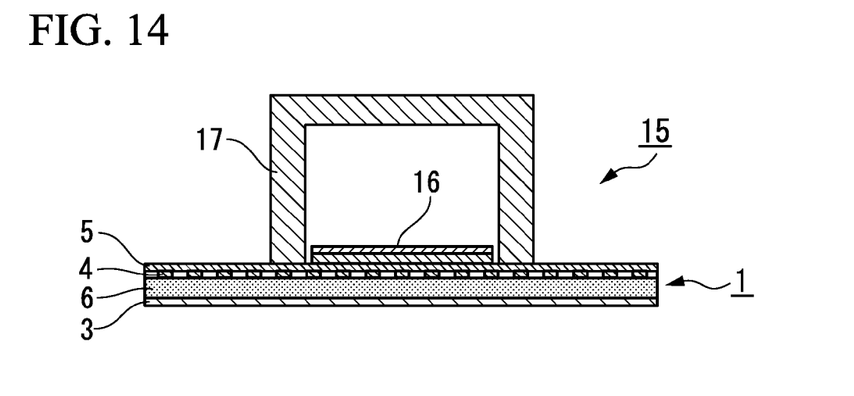
FIG. 14 is a front cross-section drawing of a communication system with a different constitution from FIG. 13.

Further, other form of the communication coupler 2 is a constitution shown in FIG. 14.

The communication coupler 15 includes: an antenna circuit 16 and a signal/electric power transmission/reception circuit (not shown in the drawings) which are in a plate shape and which are put on the signal transmission apparatus 1 for transmitting and receiving both communication signals and an electric power; and a coupler body 17 in a cup shape formed so as to cover the antenna circuit 16. In accordance with such a constitution, communication signals converted to an electromagnetic field by the antenna circuit 16 in the coupler body 17 are brought in the signal transmission apparatus 1, and after this, a communication is conducted with a second communication coupler (not shown in the drawings) via transmission inside the signal transmission apparatus 1.

In addition, similar to Patent Documents 1 and 2 as described above, techniques are disclosed in Patent Documents 3 to 5 in which an electromagnetic field is included in an area sandwiched between a pair of sheet shape bodies which are facing each other and which are electrode portions, the electromagnetic field is proceeded to conduct a communication by changing the voltage applied between a pair of the sheet shape bodies.

Specifically, a communication apparatus shown in Patent Document 1 has a signal transmission apparatus including at least one of a first signal transmission layer (second sheet conductive portion 4) and a second signal transmission layer (first sheet conductive portion 3) which is an electric power layer or a ground layer, and a switch is set between the first and second signal transmission layers by which both of them are short-ended each other.

Further, a communication apparatus shown in Patent Document 4 has a signal transmission apparatus with a laminated structure including a first conductive portion (second sheet conductive portion 4) and a second conductive portion (first sheet conductive body 3), both of which have a sheet shape (for example, form of cloth, form of paper, form of foil, form of board, form of membrane, form of film and form of mesh, and spread or extended as a surface), and a constitution is disclosed in which a loop antenna or a dipole antenna is used as a communication coupler in the signal transmission apparatus to conduct a communication.

Furthermore, a communication apparatus shown in Patent Document 5 has a signal transmission apparatus including a first conductive portion (second sheet conductive portion 4) and a second conductive portion which have a sheet shape and which are laminated, and a radio absorptive body in a wedge shape is formed on a substrate constituted from the first and second conductive bodies to avoid reflection and leakage by reducing the electromagnetic waves irradiated from communication elements.

PRIOR ART DOCUMENTS

Patent Documents

Patent document 1: Japanese Patent Application, First Publication No. 2007-82178
Patent document 2: Japanese Patent Application, First Publication No. 2007-281678
Patent document 3: Japanese Patent Application, First Publication No. 2005-93603
Patent document 4: Japanese Patent Application, First Publication No. 2007-150654
Patent document 5: Japanese Patent Application, First Publication No. 2007-53337

In the communication apparatuses shown in Patent Documents 1 to 5 above, the electric power brought in the sheet shape antenna constituting the signal transmission apparatus 1 via the communication coupler 2 is reflected at an edge of a sheet constituting the second sheet conductive body, and standing waves are generated. In such standing waves, strong portions and weak portions alternately appear in the electromagnetic waves between the first sheet conductive portion 3 and the second sheet conductive portion 4. In particular, the electric field generated on an edge portion of the mesh shape sheet which forms the second sheet conductive portion 4 is radiated in the air, there is a possibility in which such radiated electric field can have a negative effect on other electric devices, and due to such various problems, a method is desired to reduce leakage of the electromagnetic waves from the edge. Further, there is a desire in which the standing waves are not generated by the communication inside the signal transmission apparatus 1 when a frequency used by the communication is different form a power transmission, or alternatively in a case in which the standing waves are generated inside the signal transmission apparatus 1 when transmitting the electric power, there is a desire to reduce the loss of the signals as much as possible.

Figure 15:
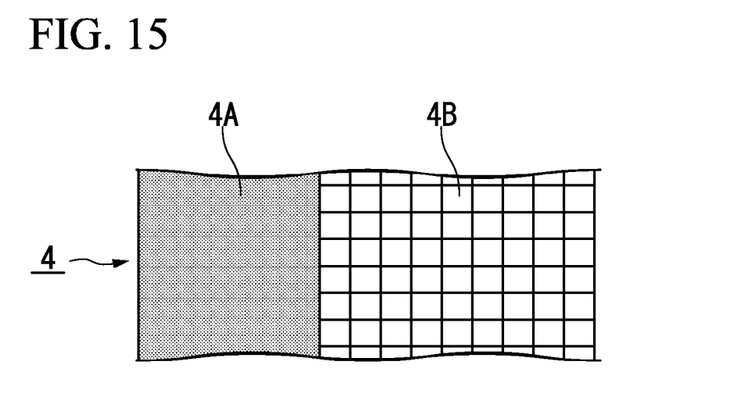
FIG. 15 is a plan view showing a portion of a second sheet conductive body of s signal transmission means of a communication system of FIG. 13 or 14.
Figure 16:
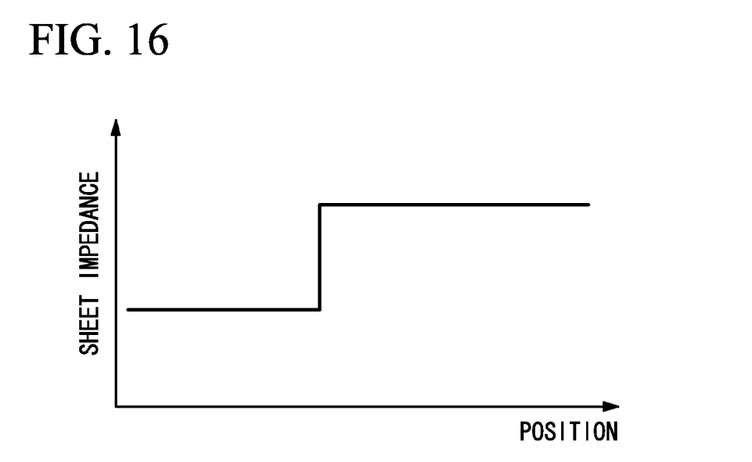
FIG. 16 is a graph showing a sheet impedance corresponding to a position of a second sheet conductive body of a signal transmission means of FIG. 15.

In reference to FIGS. 15 and 16, the above problems are particularly described. FIG. 15 is a plan view showing a portion of the second sheet conductive body of the signal transmission means 1 of the communication system of FIG. 13 or 14, and FIG. 16 shows changes of a sheet impedance when using connection method of FIG. 13 or 14.

A portion pointed with a reference numeral "4A" of FIG. 15 is a conductive body surface without holes of the mesh on which the communication coupler 2 is set on the second sheet conductive portion 4, and the mesh in a uniform shape is formed on portions of the second sheet conductive portion 4 other than 4A, for example, pointed by a reference numeral "4B".

In such second sheet conductive body portion 4, the sheet impedance largely changes at a boundary between the conductive body surface 4A and the mesh 4B. In such a place, reflections of the electromagnetic waves are generated. On a communication surface (4A), by using leakage of the electromagnetic waves conducting on a surface in an evanescent manner in a direction toward an upper surface of the sheet, a communication with the communication coupler is possible. When there are only such components in an evanescent manner, there is a small amount of the electromagnetic waves radiated to a far field. However, if a portion of the electromagnetic waves are reflected at a discontinuous portion of the impedance when the impedance rapidly changes, the electromagnetic waves rapidly change the direction and are in a state which is not an evanescent mode. Therefore, there is a reflection of the electromagnetic waves in the far field, and due to this, there is a problem in which it is not possible to communicate with high quality.

The present invention is conceived due to the above-described problem and provides with a technique for reducing leakage electromagnetic field that reduces the electromagnetic leakage from a connection point between the communication coupler and the signal transmission apparatus and that can conduct both communication and transmission of the electric power.

DISCLOSURE OF INVENTION

The present invention proposes solutions shown below to resolve the above-described problems.

The present invention is a signal transmission apparatus for communicating by propagating a signal as an electromagnetic field transmitted via a communication coupler that includes: a first sheet conductive body portion constituting a lower portion electrode; and a second sheet conductive body portion in a mesh shape which is laminated on the first sheet conductive body portion while a gap area is sandwiched therebetween, and an uneven mesh size area on which a sheet impedance is continuously changed is formed on the second sheet conductive body portion.

Further, the present invention is a communication coupler for transmitting and receiving signals to/from a signal transmission apparatus including a coupler body housing a communication element, and an uneven mesh size area body formed on the coupler body that continuously changes a sheet impedance when being put on a mesh shape conductive body portion of the signal transmission apparatus.

The present invention is an impedance adjustment sheet including: a first sheet conductive body portion constituting a lower portion electrode; and a second sheet conductive body portion in a mesh shape which is laminated on the first sheet conductive body portion while a gap area is sandwiched therebetween, wherein the impedance adjustment sheet is attached to a signal transmission apparatus for propagating a communication signal as an electromagnetic field and includes an uneven mesh size area which continuously changes a sheet impedance being formed by adhering the impedance adjustment sheet on a surface of an edge portion of the second sheet conductive body portion so as to partially cover the mesh holes.

In accordance with the present invention, an uneven mesh size area is formed at which the sheet impedance is continuously changed. For example, the uneven mesh size area has a constitution in which, multiple columns each of which includes mesh holes with a uniform size are formed, and the mesh holes of each mesh column have a size which is gradually changed compared to neighboring mesh columns. Such uneven mesh size area are formed on an edge portion of a communication surface when transmitting large amount of electric power or in a surrounding area of the communication coupler when the communication coupler is set, and due to this, it is possible to largely reduce the radiation from a discontinuous portion of the impedance as seen in the prior art. As a result, it is possible to reduce leakage of the electromagnetic waves from such a portion, and it is possible to conduct communication or transmission of the electric power with safety and high reliability.

BEST MODE FOR CARRYING OUT THE INVENTION

FIRST EXAMPLE

A first example of the present invention is explained in reference to FIGS. 1-7.

Figure 1:
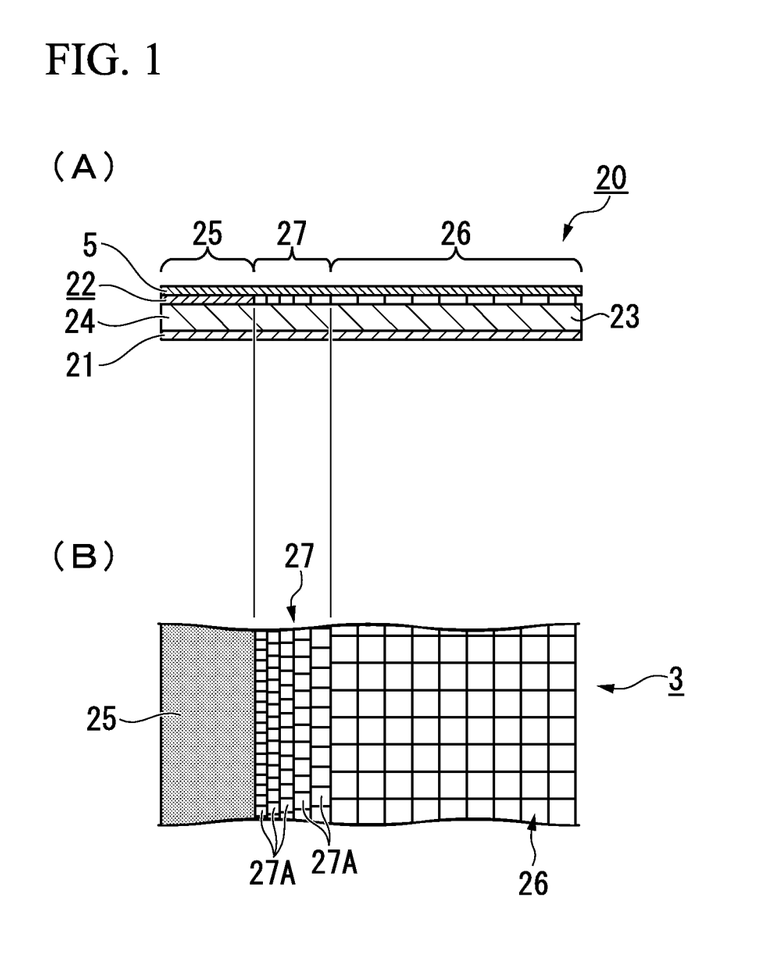
FIG. 1 is a drawing showing a signal transmission means that describes a first example of the present invention, (A) is a front view, and (B) is a plan view.

(A) and (B) of FIG. 1 are a cross-section drawing and a plan view showing a signal transmission apparatus 20 as a communication medium for communicating by propagating signals transmitted from a communication coupler (not shown in the drawings) as an electromagnetic field. The signal transmission apparatus 20 is a laminated body which has a constitution including a first sheet conductive body portion 4 forming a lower portion electrode, a second sheet conductive body portion 3 in a mesh shape arranged at a position apart from the first sheet conductive body portion 4, and a narrow gap area 6 which is formed at a gap 23 between such sheet conductive body portions 4 and 3 and which is made from a dielectric body layer, gas or a dielectric body including plenty of air by forming bubbles.

As shown in (B) of FIG. 1, the second sheet conductive body portion 3 has a constitution including: a conductive body surface 25 without mesh holes on which, for example, an outside conductive body 12 forming a coupler body 11 of a communication coupler 2 shown in FIG. 13 or a coupler body 17 of a communication coupler 15 shown in FIG. 14 is set; a mesh portion 26 in a grid shape which is a communication surface and which has a uniform mesh size in the same manner as conventional techniques; and an uneven mesh size area 27 which is arranged between the conductive body surface 25 and the mesh portion 26 and which is elongated. (It should be noted that, in (A) of FIG. 1, each area of 25, 26 and 27 is shown at an upper portion on the first dielectric body layer 5 for convenience, and these areas of 25, 26 and 27 indicates areas of the second sheet conductive body portion 30.)

On the uneven mesh size area 27 at a intermediate position, multiple mesh columns 27A (five columns in (A) of FIG. 1) along a lengthwise direction are arranged while closely neighboring each other. The uneven mesh size area 27 has a constitution in which, from mesh holes on a right side shown in FIG. 1 constituting the mesh portion 26 in a grid shape, the size becomes gradually small, and the uneven mesh size area 27 connects to the conductive surface 25 without holes arranged at a left side of the drawing. In other words, a size of the mesh holes of each mesh column 27A arranged along a lengthwise direction is designed so as to become gradually small along a direction from the mesh portion 26 to the conductive surface 25.

In addition, on the uneven mesh size area 27, the same line width is applied to between the mesh holes, and the smaller the mesh holes are, the higher the density of the mesh holes is on each mesh column 27A.

Figure 2:
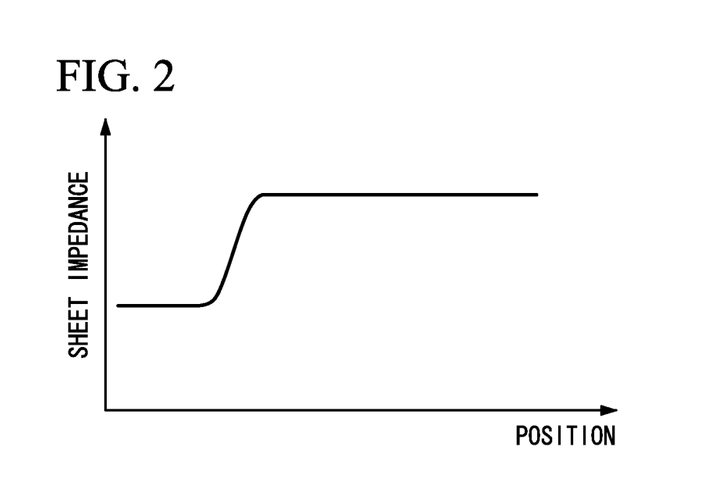
FIG. 2 is a graph showing a sheet impedance corresponding to a position of a second sheet conductive body of a signal transmission means of FIG. 2.

Further, when an impedance of the sheet is described by using a ratio between the electric field and the magnetic field of the electromagnetic waves propagated in a pair of conductive sheets (first conductive body sheet 4 and second conductive body sheet 3) arranged on upper and lower sides of the communication medium, as shown in the first example, due to the uneven mesh size area 27 on which the size of the mesh holes becomes gradually small and which is arranged at a portion where the impedance of the second conductive body sheet 3 largely changes (in this example, between the conductive surface 25 and the mesh portion 26 of the second sheet conductive body portion 3), as shown in FIG. 2, it is possible to substantially change the impedance in a gradual manner, and it is possible to reduce discontinuous portions as shown in FIGS. 15 and 16 where the impedance substantially and very largely changes.

In other words, at a position where the sheet impedance largely changes, there is a reflection of the electromagnetic waves. On the communication surface, by using leakage of the electromagnetic waves propagating on a surface in an evanescent manner in a direction toward upper surfaces of the sheets 4/3, a communication with the communication coupler is possible. When there are only such components in an evanescent manner, there is a small amount of the electromagnetic waves radiated to a far field. However, if a portion of the electromagnetic waves are reflected at a discontinuous portion of the impedance when the impedance rapidly changes, the electromagnetic waves rapidly change the direction and are in a state which is not an evanescent mode, and the electromagnetic waves radiated to a far field are generated. Therefore, by application of the uneven mesh size area 27 as shown in FIGS. 1 and 2 on which the sheet impedance continuously changes, it is possible to avoid generation of reflection of the electromagnetic waves and to reduce radiation of the electromagnetic field to the far field.

As described above in detail, in accordance with the communication transmission apparatus shown in the first example, the uneven mesh size area 27 on which the sheet impedance continuously changes is arranged at a portion where the impedance of the second conductive body sheet 3 largely changes (in this example, between the conductive surface 25 and the mesh portion 26 of the second sheet conductive body portion 3), and in a concrete example, a constitution is applied in which multiple mesh columns 27A each of which includes mesh holes with a uniform size are formed while the mesh holes of each mesh column 27A have a size which is gradually changed compared to neighboring mesh columns 27A. Such uneven mesh size area 27 is arranged, for example, close to the coupler body 11 of the communication coupler 2 (see FIG. 13) or the coupler body 17 of the communication coupler 15 (see FIG. 14) or is arranged, for example, at an edge portion of the communication surface used for transmitting a large amount of the electric power. Due to this, it is possible to largely reduce radiation from discontinuous portion of impedance as shown in the prior art, and as a result, it is possible to reduce leakage of the electromagnetic waves from such a portion and to conduct communication or transmission of the electric power with safety and high reliability.

It should be noted that it is modify the second sheet conductive portion 3 shown in the first example in a manner as shown below.

VARIATION EXAMPLE 1

Figure 3:
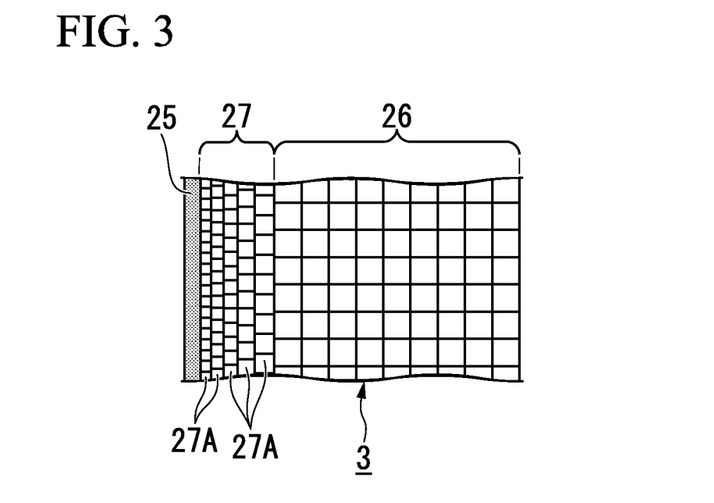
FIG. 3 is a plan view showing a variation example 1(1) of the first example.
Figure 4:
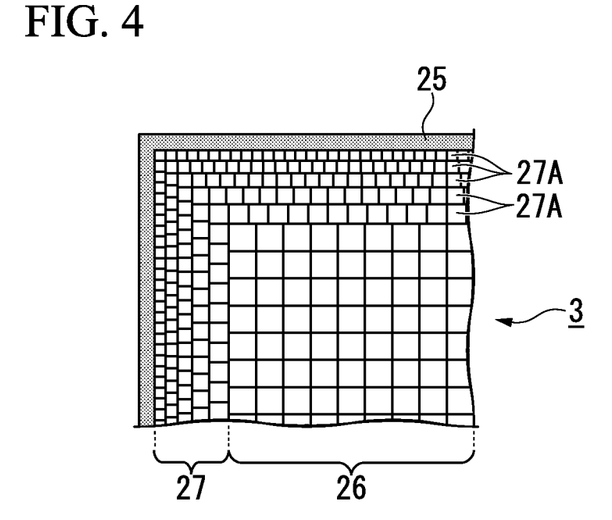
FIG. 4 is a plan view showing a variation example 1(2) of the first example.

On the second sheet conductive body 3 shown in the above-described first example, the conductive surface 25 without mesh holes is arranged at a position on which the outside conductive body 12 of the communication coupler 2 is set, this is not a limitation, and as shown in FIG. 3, it is possible to arrange such conductive surface 25 at a short end or an open end.

In other words, it is possible to use the short end (for example, a portion at which the upper side and lower side sheets 4/3 are connected) or the open end (for example, a portion at which EBG (electric band-gap) structure is formed) as the conductive surface 25 and to arrange the uneven mesh size area 27 which can continuously change the sheet impedance at a position between the conductive surface 25 and the mesh portion 26.

Further, a shape of the conductive surface 25 of the second sheet conductive body portion 3 at which the short end or the open end is arranged is not limited to a linear shape and can be a bent shape including a bent portion for being set at a corner portion.

VARIATION EXAMPLE 2

Figure 5:
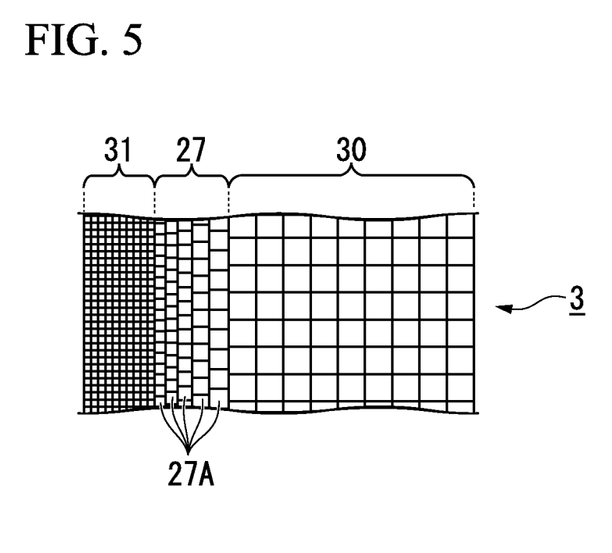
FIG. 5 is a plan view showing a variation example 2 of the first example.

On the second sheet conductive body portion 3 shown in the above-described example 1, the uneven mesh size area 27 is arranged so as to be close to the mesh portion 26 in a grid shape including mesh holes with uniform size, and in addition, as shown in FIG. 5, between a mesh portion 30 in a grid shape with mesh holes having a large size and a mesh portion 31 in a grid shape with mesh holes having a small size, such uneven mesh size area 27 can be formed by gradually changing a mesh size of each column so as to connect meshes of the mesh portions 30 and 31.

Further, in accordance with such a constitution, when a pair of communication mediums, that are, the mesh portions 30 and 31 with different mesh sizes are connected, it is possible to apply the present technique that can reduce discontinuous portions at which the impedance largely changes.

VARIATION EXAMPLE 3

Figure 6:
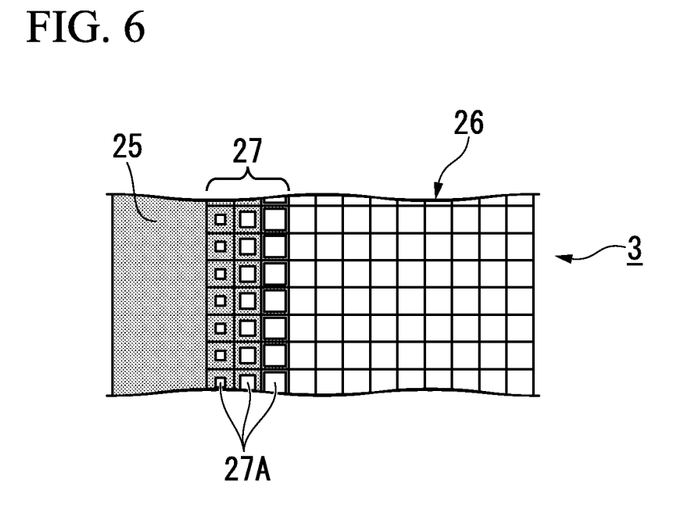
FIG. 6 is a plan view showing a variation example 3(1) of the first example.

In FIGS. 1-5 described above, on one mesh column 27A of the uneven mesh size area 27 of the second sheet conductive body portion 3, the smaller the mesh size is, the higher the density becomes while the line width is uniform, and on the other hand, as a constitution in which the sheet impedance is continuously changed, a constitution as shown in FIG. 6 can be used in which on the above-described uneven mesh size area 27, a distance between holes or a distance between grids is uniform while the smaller the mesh hole is, the comparatively larger the line width applied to the mesh column 27A is.

Figure 7:
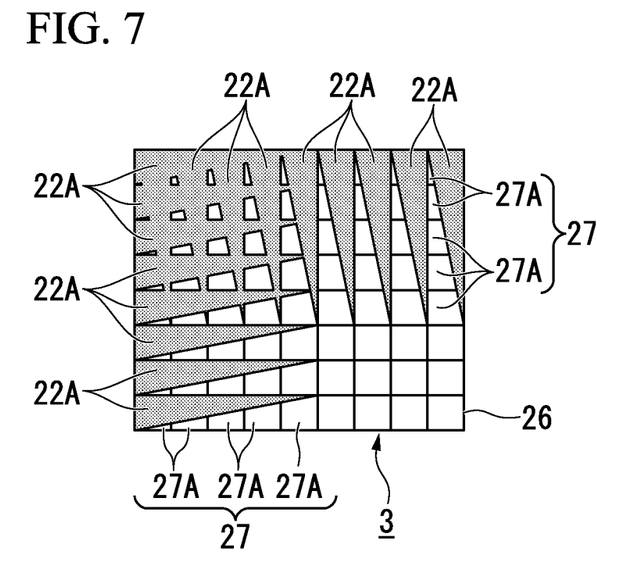
FIG. 7 is a plan view showing a variation example 3(2) of the first example.

Further, as a constitution in which the sheet impedance is continuously changed, a constitution as shown in FIG. 7 can be used in which frames (identified by reference numeral "22A") of the second sheet conductive body portion 3 are formed in a triangle to form an opening area of the hole so as to be gradually small. In such a case, the frame 22A is arranged at each column of the multiple mesh columns 27A and partially covers the mesh columns 27A so as to gradually change the size of the mesh holes.

SECOND EXAMPLE

Figure 8:
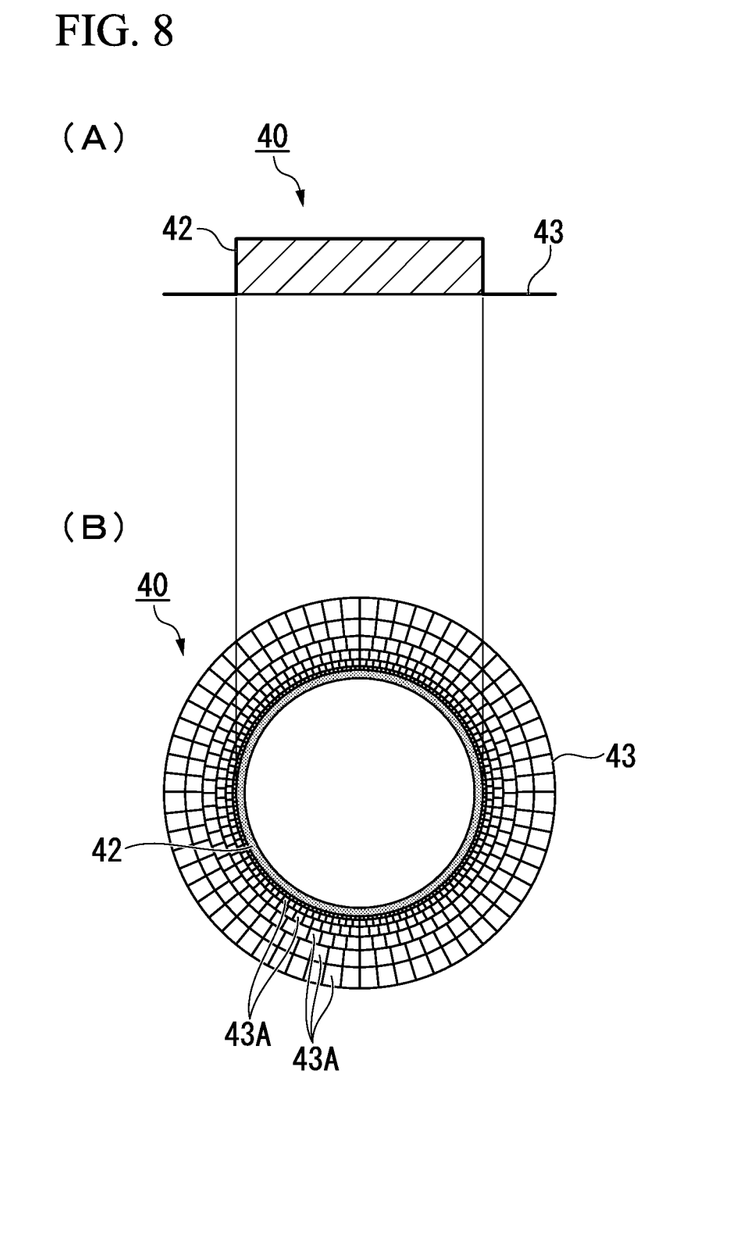
FIG. 8 shows a communication coupler for describing a second example of the present invention, (A) is a front view, and (B) is a plan view.
Figure 9:
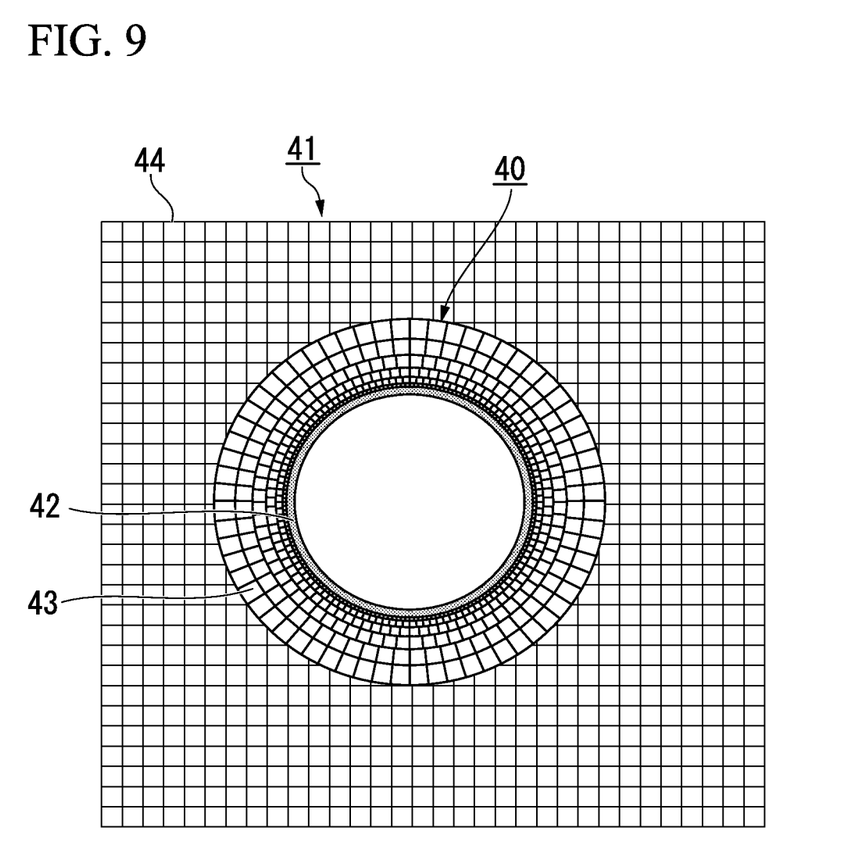
FIG. 9 is a plan view showing a state in which the communication coupler of FIG. 8 is set on a second sheet conductive body which is a signal transmission means.

In reference to FIGS. 8 and 9, the second example of the present invention is explained.

In FIG. 8, a reference numeral "40" indicates a communication coupler for transmitting/receiving signals to/from a signal transmission apparatus 41. The communication coupler 40 used here has, for example, a constitution shown in FIG. 13 or 14, and in such a constitution, at an outside surface portion of the coupler body (corresponding to 17) of FIG. 14, an uneven mesh size area body 43 is formed so as to protrude outside in which the sheet impedance continuously changes.

As shown in FIG. 8, the uneven mesh size area body 43 has concentrically formed multiple mesh columns 43A each of which includes mesh holes of the same size while the mesh holes of each mesh column 43A have a size which is gradually changed compared to neighboring mesh columns 43A.

In addition, as shown in FIG. 8, when the communication coupler 40 is attached on a upper surface of the signal communication apparatus 41, the uneven mesh size area body 43 partially covers the mesh holes with uniform shape on the second sheet conductive body portion 44, and therefore, it is possible to form an area on which the sheet impedance continuously changes between the communication coupler 40 and the signal transmission apparatus 41.

As described above, in accordance with the communication coupler 40 explained in the second example, the uneven mesh size area body 43 is formed on the outside surface portion of the coupler body 42 so as to protrude toward outside for continuously changing the sheet impedance. Concretely, the mesh holes in an uniform shape of the second sheet conductive portion 44 constituting the signal transmission apparatus 41 are partially closed when the communication coupler 40 is set on an upper surface of the signal transmission apparatus 41 because the uneven mesh size area body 43 which causes continuous change of the sheet impedance is arranged at the coupler body 42 of the communication coupler 40, due to this, it is possible to form an area at which the sheet impedance is continuously changed, and hereby, it is possible to largely reduce radiation from discontinuous portions of the impedance as seen in the prior art, to reduce leakage of the electromagnetic waves when being set on the signal transmission apparatus 41, and to conduct communication or transmission of the electric power with safety and high reliability.

It should be noted that the uneven mesh size area body 43 is not limited to by a constitution shown in (B) of FIG. 8, and a constitution as shown in FIG. 6 of the first example can be used in which a distance between holes or a distance between grids is uniform on one mesh column 43A while the smaller the mesh hole is, the comparatively larger the line width is.

THIRD EXAMPLE

Figure 10:
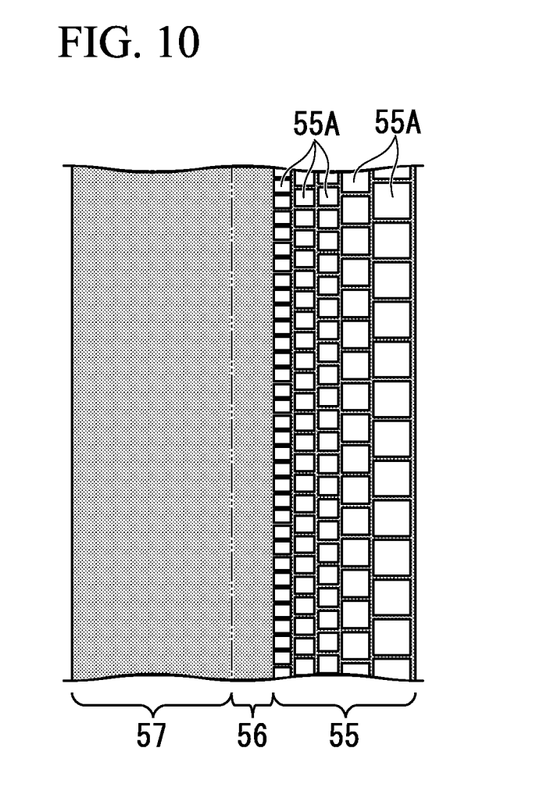
FIG. 10 is a plan view showing a state in which an impedance adjustment sheet for describing a third example of the present invention is extended.
Figure 11A:
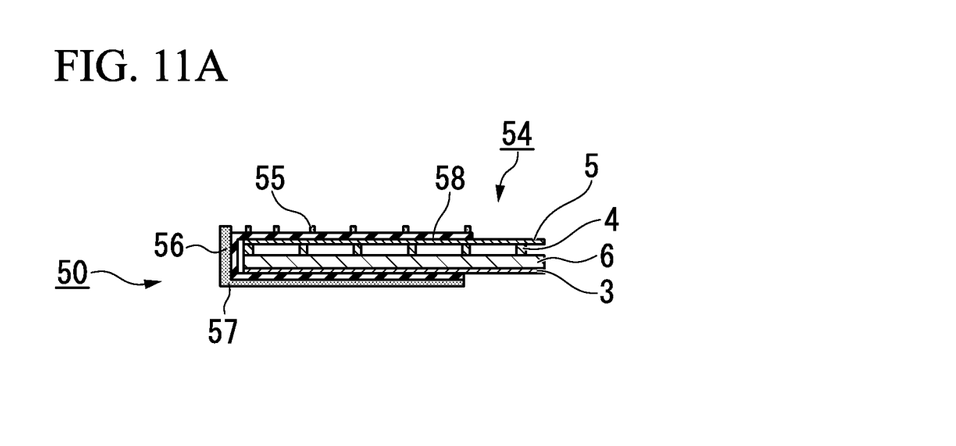
FIG. 11A is a front view of the third example in which the impedance adjustment sheet of FIG. 10 is set applied to the signal transmission means.
Figure 11B:
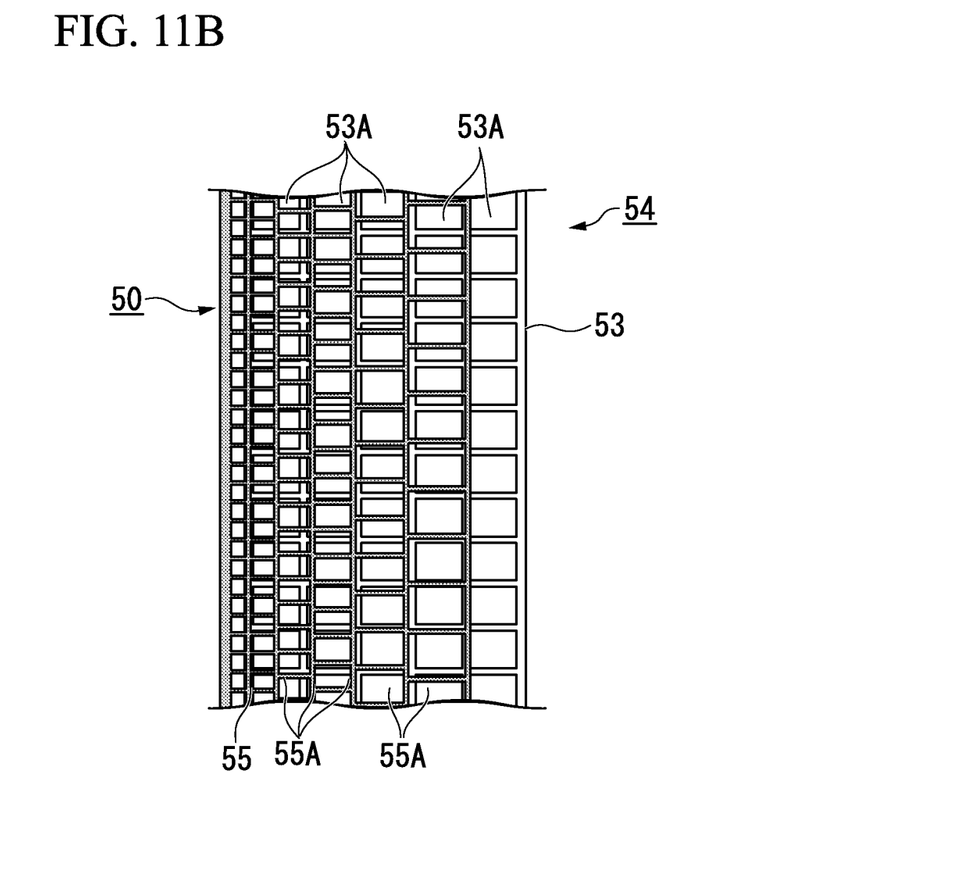
FIG. 11B is a front view of the third example in which the impedance adjustment sheet of FIG. 10 is set applied to the signal transmission means.
Figure 12:
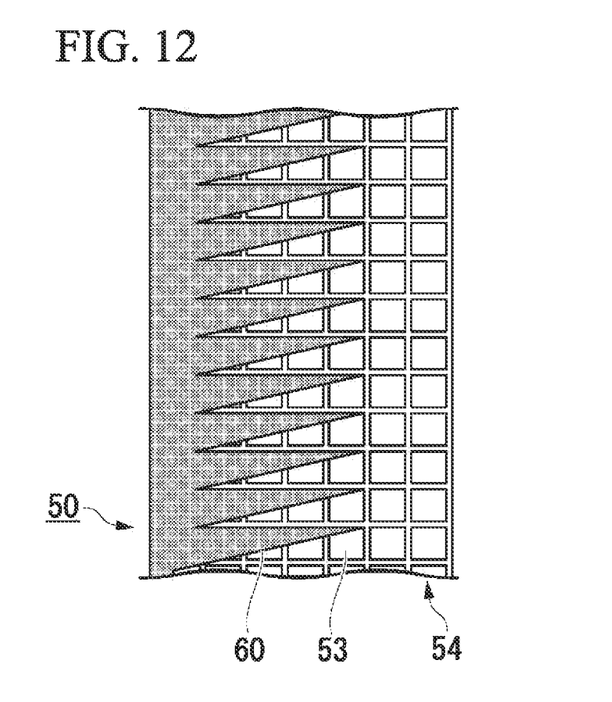
FIG. 12 is a front view showing a variation example of FIGS. 11A and 11B.

In reference to FIGS. 10 to 12, an impedance adjustment sheet of the third example of the present invention is explained.

As shown in FIGS. 11A and 11B, an impedance adjustment sheet 50 shown in FIG. 10 is attached to a communication transmission apparatus 54 having a constitution including both a first sheet conductive body portion 51 (corresponding to a reference numeral "4" of FIG. 11A) which constitutes a lower portion electrode and a second sheet conductive body portion 53 (corresponding to a reference numeral "3" of FIG. 11A) in a mesh shape which is laminated under the first sheet conductive body portion 51 while a gap area 52 (corresponding to a reference numeral "6" of FIG. 11A) is sandwiched therebetween, and the whole impedance adjustment sheet 50 is formed by laminating conductive material on a adhesive tape 58 which is made from an adhesive and a nonmetal.

In other words, the impedance adjustment sheet 50 has a constitution integrally including an uneven mesh size area 55, a sheet thickness portion 56 and a lower surface sheet portion 57 as shown in FIG. 10, the uneven mesh size area 55 partially covers mesh holes in a uniform shape included in mesh columns 53A which constitute the second sheet conductive portion 53 of the signal transmission apparatus 54 when adhering the impedance adjustment sheet 50 using the adhesive tape 58 so as to cover an edge portion of the signal transmission apparatus 54, further, the sheet thickness portion 56 is arranged so as to seal the gap area 52 between the first sheet conductive portion 51 and the second sheet conductive portion 53, and in addition, the lower surface sheet portion 57 is arranged under the first sheet conductive body portion 51 of the signal transmission apparatus 54. It should be noted that a boundary between the sheet thickness portion 56 and the lower surface sheet portion 57 is shown by a chain double-dashed line in FIG. 10.

The uneven mesh size area body 55 of the above-described impedance adjustment sheet 50 has multiple mesh columns 55A each of which includes mesh holes of the same size while the mesh holes of each mesh column 55A have a size which is gradually changed compared to neighboring mesh columns 55A.

In addition, as shown in FIGS. 11A and 11B, the impedance adjustment sheet 50 partially closes the mesh holes in a uniform shape included in the mesh columns 53A of the second sheet conductive body portion 53 because the mesh columns 55A of the uneven mesh size area 55 are put on the mesh columns 53A of the second sheet conductive body portion 53 so as to correspond each other when the impedance adjustment sheet 50 is attached to the signal transmission apparatus 54, and as a result, it is possible to form an area on which the sheet impedance is continuously changed on the signal transmission apparatus 54.

As described above, in accordance with the impedance adjustment sheet 50 shown in the third example, the uneven mesh size area 55 which continuously changes the sheet impedance is formed by being adhered on a surface of an edge portion of the second sheet conductive body portion 53 of the signal transmission apparatus 54 in a manner in which the mesh holes are partially covered. Therefore, as shown in FIGS. 11A and 11B, the uneven mesh size area 55 of the impedance adjustment sheet 50 partially closes the mesh holes in a uniform shape included in the mesh columns 53A of the second sheet conductive body portion 53 when the impedance adjustment sheet 50 is attached to the signal transmission apparatus 54. Due to this, it is possible to form an area on which the sheet impedance is continuously changed on the signal transmission apparatus 54. As a result, such uneven mesh size area 55 is arranged, for example, close to the coupler body 11 of the communication coupler 2 (see FIG. 13) or the coupler body 17 of the communication coupler 15 (see FIG. 14) or is arranged, for example, at an edge portion of the communication surface used for transmitting a large amount of the electric power. Due to this, it is possible to largely reduce radiation from discontinuous portion of impedance as shown in the prior art, and as a result, it is possible to reduce leakage of the electromagnetic waves from such a portion and to conduct communication or transmission of the electric power with safety and high reliability.

It should be noted that the uneven mesh size area 55 of the above-described third example is not limited to by constitutions described in FIG. 10 and FIG. 11A/11B, and as shown in FIG. 12, it is possible to be constituted from multiple conductive body sheets 60 which are adhered so as to partially cover the mesh holes of the second conductive body portion 53 and which are formed in a triangle. Such multiple conductive body sheets 60, when being adhered on the second sheet conductive body portion 53, are arranged on each of multiple mesh columns 55A constituting the second sheet conductive body portion 53 and partially close the mesh columns 53A so as to gradually change the size of the mesh holes of each column, and due to this, the same advantage can be obtained as the uneven mesh size area of FIG. 10 and FIGS. 11A and 11B as described above.

Further, the uneven mesh size area 55 of the impedance adjustment sheet 50 is not limited to by constitutions described in FIG. 10, and a constitution as shown in FIG. 6 of the first example can be used in which a distance between holes or a distance between grids is uniform on one mesh column 55A while the smaller the mesh hole is, the comparatively larger the line width is.

Further, the above-described impedance adjustment sheet 50, when being applied to the signal transmission apparatus 54, includes both the sheet thickness portion 56 arranged so as to seal the gap area 52 between the first sheet conductive portion 51 and the second sheet conductive portion 53 and the lower surface sheet portion 57 arranged under the first sheet conductive body portion 51. However, the sheet thickness portion 56 and the lower surface sheet portion 57 are not essential constitutional elements, and a constitution can be used in which the mesh holes of the second sheet conductive body portion 53 are partially covered by only the uneven mesh size area 55 in a manner such as FIGS. 10-12 described above.

It should be noted that it is effective to form a so-called short end by connecting end portions of the first and second sheet conductive bodies.

Figure 17:
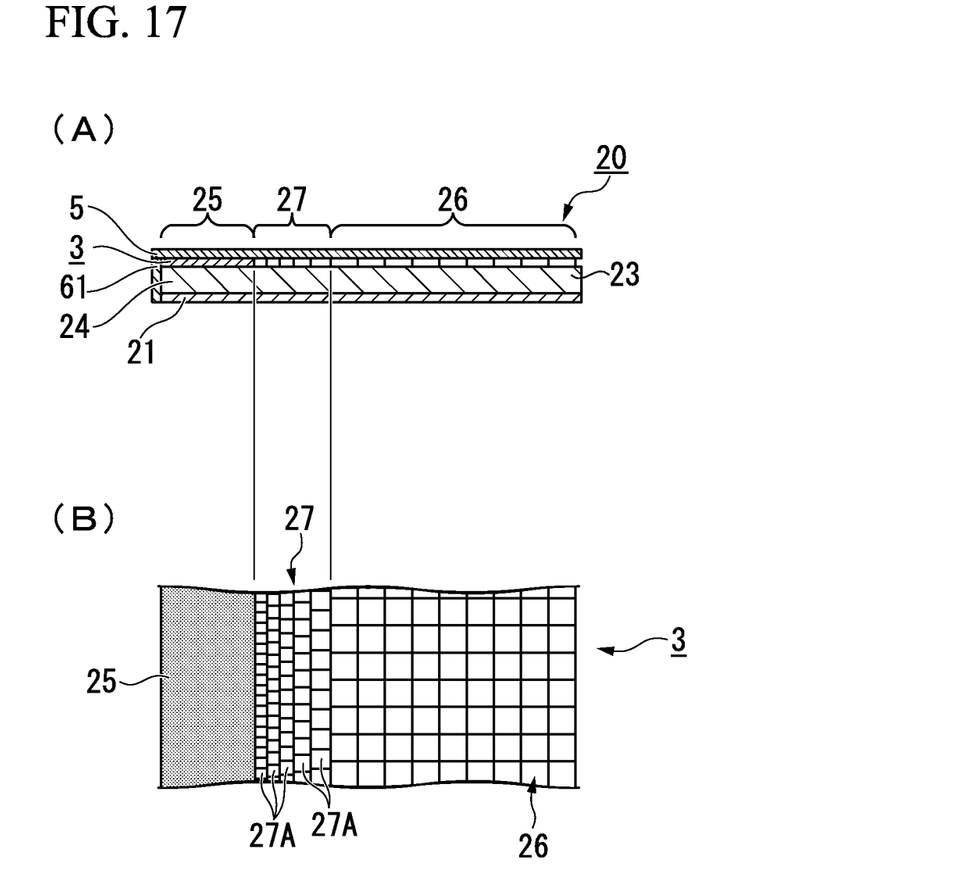
FIG. 17 is a cross-section drawing of an example in which the sheet conductive bodies on front and back sides of the first example are short-ended.

In other words, FIG. 17 is a cross-section drawing showing the signal transmission apparatus 20 having a short end, and a short end conductive body 61 is set between a first sheet conductive body portion 4 forming a lower portion electrode and a second sheet conductive body portion 3 in a mesh shape for connecting them to each other.

Figure 18:
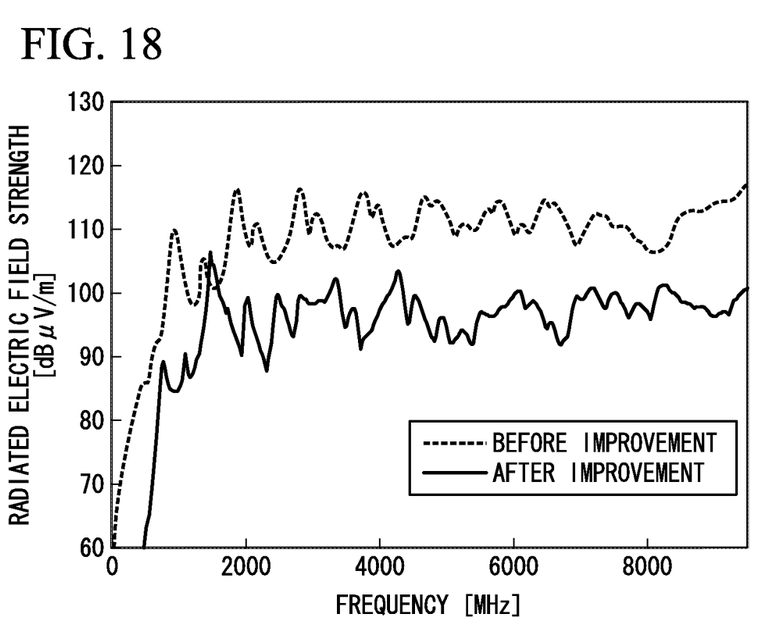
FIG. 18 is a drawing showing characteristics including both frequency characteristics of radiated electromagnetic field strength of an example to which the present invention is applied and a comparative example.

FIG. 18 shows reduction effects of leakage of the electromagnetic wave when using the present invention while the uneven sheet impedance area is set to a 7 mm mesh with a short end. For comparison, both a condition of a sheet in which an open end is simply applied to a 7 mm mesh (i.e. before improvement by using the present invention) and a condition in which an uneven mesh size area of 35 mm and a metal area of 5 mm are applied to an edge portion of the 7 mm mesh (i.e. after improvement by using the present invention) are shown. According to this, in a case in which sheet conductive bodies arranged on front and back are short-ended at an edge portion, compared to a case in which the sheet conductive bodies are not short-ended, a reduction effect of radiation of 10 dB to 15 dB is obtained at GHz band.

As described above, embodiments of the present invention are explained in detail in reference to the drawings. However, a concrete constitution is not limited by these embodiments and includes design changes which do not deviate from the concept of the present invention.

INDUSTRIAL APPLICABILITY

The present invention relates to a communication system constituted from a sheet-shaped communication transmission apparatus and a communication coupler which is put on the communication transmission apparatus and which transmits a signal to a signal transmission apparatus, and in particular, relates to an electromagnetic field leakage reduction technique which reduces electromagnetic field when conducting a communication.

BRIEF DESCRIPTION OF THE DRAWINGS

20 ... signal transmission means
3 ... second sheet conductive body
27 ... uneven mesh size area
27A ... mesh column
40 ... communication coupler
41 ... signal transmission means
42 ... coupler body
43 ... uneven mesh size area body
43A ... mesh column
44 ... second sheet conductive body portion
50 ... impedance adjustment sheet
53 ... second sheet conductive body portion
54 ... signal transmission means
55 ... uneven mesh size area
55A ... mesh column
56 ... sheet thickness portion
57 ... lower surface sheet portion
60 ... conductive sheet
61 ... sheet-circuited end conductive body

The invention claimed is:

1. A signal transmission apparatus for communicating by propagating a signal as an electromagnetic field transmitted via a communication coupler, the signal transmission apparatus comprising:
a first sheet conductive body portion constituting a lower portion electrode; and
a second sheet conductive body portion in a mesh shape which is laminated on the first sheet conductive body portion while a gap area is sandwiched therebetween and which comprises an uneven mesh size area on which a sheet impedance is continuously changed,
wherein the uneven mesh size area comprises a plurality of mesh columns each including mesh holes of a uniform size, and the size of the mesh holes of each mesh column is gradually changed compared to neighboring mesh columns.

2. The signal transmission apparatus according to claim 1, wherein a line width between the mesh holes of the uneven mesh size area is uniform, and the smaller the mesh holes are, the higher a density of the mesh holes of said each mesh column is.

3. The signal transmission apparatus according to claim 1, wherein a distance between holes or a distance between grids is uniform on the uneven mesh size area, and the smaller the mesh hole is, the comparatively larger line width of the mesh column is.

4. The signal transmission apparatus according to claim 1, further comprising a short end which connects end portions of the first sheet conductive body portion and the second sheet conductive body portion.

5. A communication coupler for communicating with a signal transmission apparatus, comprising:
a coupler body housing a communication element; and an uneven mesh size area body attached to the coupler body continuously changing a sheet impedance when being put on a mesh shape conductive body portion of the signal transmission apparatus,
wherein the uneven mesh size area comprises a plurality of mesh columns each including mesh holes of a uniform size, the size of the mesh holes of each mesh column is gradually change compared to neighboring mesh columns.

6. The signal transmission apparatus according to claim 5, wherein a line width between the mesh holes of the uneven mesh size area is uniform, and the smaller the mesh holes are, the higher a density of the mesh holes of said each mesh column is.

7. The signal transmission apparatus according to claim 5, wherein a distance between holes or a distance between grids is uniform on the uneven mesh size area, and the smaller the mesh hole is, the comparatively larger line width of the mesh column is.

8. An impedance adjustment sheet comprising:
a first sheet conductive body portion constituting a lower portion electrode; and
a second sheet conductive body portion in a mesh shape which is laminated on the first sheet conductive body portion while a gap area is sandwiched therebetween,
wherein the impedance adjustment sheet is attached to a signal transmission apparatus for propagating a communication signal as an electromagnetic field, and
an uneven mesh size area which continuously changes a sheet impedance is formed by adhering the impedance adjustment sheet on a surface of an edge portion of the second sheet conductive body portion so as to partially cover the mesh holes,
wherein the uneven mesh size area comprises a plurality of mesh columns each including mesh holes of a uniform size, the size of the mesh holes of each mesh column is gradually changed compared to a neighboring mesh columns.

9. The impedance adjustment sheet according to claim 8, wherein a lower surface sheet portion attached to a lower surface of the first sheet conductive body portion of the signal transmission apparatus is set to the uneven mesh size area via a sheet thickness portion arranged at a position of a gap area.

10. The impedance adjustment sheet according to claim 8, wherein a line width between the mesh holes of the uneven mesh size area is uniform, and the smaller the mesh holes are, the higher a density of the mesh holes of said each mesh column is.

11. The impedance adjustment sheet according to claim 8, wherein a distance between holes or a distance between grids is uniform on the uneven mesh size area, and the smaller the mesh hole is, the comparatively larger line width of the mesh column is.

12. The impedance adjustment sheet according to claim 8, wherein the uneven mesh size area comprises a plurality of conductive body sheets formed in triangle and adhered to partially cover the mesh holes of the second sheet conductive body portion, when said plurality of conductive sheets are adhered to the second sheet conductive body portion, said plurality of conductive sheets are arranged at each of said plurality of mesh columns constituting the second sheet conductive body portion and partially close the mesh columns to gradually change a size of the mesh holes of each of the mesh columns.

* * * * *